United States Patent [19]
Ohkura et al.

[11] Patent Number: 5,867,700
[45] Date of Patent: Feb. 2, 1999

[54] INFORMATION PROCESSING APPARATUS AND METHOD FOR DISPLAYING A FIRST WINDOW DISPLAYING A LIST OF NAMES OF ATTRIBUTE INFORMATION AND A SECOND WINDOW DISPLAYING SEARCH AND SUBSTITUTION COMMAND COLUMNS

[75] Inventors: Hitoshi Ohkura; Takahiro Kato, both of Tokyo, Japan

[73] Assignee: Canon Kabushiki Kaisha, Tokyo, Japan

[21] Appl. No.: 323,576

[22] Filed: Oct. 17, 1994

Related U.S. Application Data

[63] Continuation of Ser. No. 048,942, Apr. 20, 1993, abandoned, which is a continuation of Ser. No. 841,775, Mar. 2, 1992, abandoned, which is a continuation of Ser. No. 270,049, Nov. 14, 1988, abandoned.

[30] Foreign Application Priority Data

Nov. 16, 1987 [JP] Japan ................................. 62-289164

[51] Int. Cl.$^6$ ..................................................... G06F 3/00
[52] U.S. Cl. ........................................................... 395/601
[58] Field of Search ................................... 395/600, 500, 395/700, 157, 601, 602, 603, 604, 605; 364/419

[56] References Cited

U.S. PATENT DOCUMENTS

| | | | |
|---|---|---|---|
| Re. 33,706 | 10/1991 | Mohri ................................. | 364/DIG. 2 |
| 4,318,184 | 3/1982 | Millett et al. ............................. | 395/600 |
| 4,392,758 | 7/1983 | Bowles et al. ......................... | 400/697.1 |
| 4,439,838 | 3/1984 | Klingenberg ............................ | 364/900 |
| 4,459,049 | 7/1984 | Howell et al. ........................... | 364/900 |
| 4,509,138 | 4/1985 | Hayashi et al. .......................... | 364/900 |
| 4,598,384 | 7/1986 | Shaw et al. ............................. | 395/157 |
| 4,653,620 | 3/1987 | Cheselka et al. ........................ | 395/157 |
| 4,797,854 | 1/1989 | Nakazaki et al. ........................ | 364/900 |
| 4,849,908 | 7/1989 | Kurokawa et al. ...................... | 364/518 |
| 4,881,197 | 11/1989 | Fischer ................................... | 364/900 |
| 4,907,173 | 3/1990 | Yamada et al. .......................... | 364/518 |
| 4,916,656 | 4/1990 | Sasaki .................................... | 364/900 |
| 4,931,987 | 6/1990 | Kawakami .............................. | 364/900 |
| 4,937,036 | 6/1990 | Beard ..................................... | 395/500 |
| 4,954,956 | 9/1990 | Yamakawa et al. ..................... | 364/419 |
| 5,121,499 | 6/1992 | McCaskill et al. ...................... | 395/700 |

OTHER PUBLICATIONS

Susan Baake Kelly, "Mastering WordPerfect" 1987 pp. 1–25.
Susan Baake Kelly, "Mastering WordPerfect" 1987 pp. 109–121.
"Using Enable" 2nd Edition by Charles Spezzano 1987 pp. 206–211 and 232–239.
by Gregg Williams, The Apple Macintosh Computer Feb. 1984, ALL.
IBM Technical disclosure bulletin, vol. 28 No. 4 Sep. 1985, Method for creating amatution data, ALL.
Microsoft, user's Guid, Jan. 1987, ALL.
"Den Umgang mit Wordstar Schnell und einfach lernen" by Wolfgang Maas, pp. 71–81, 1984.

*Primary Examiner*—Ayaz Sheikh
*Attorney, Agent, or Firm*—Fitzpatrick, Cella, Harper & Scinto

[57] ABSTRACT

An information processing apparatus includes a keyboard for inputting character information and attribute information of the character information, a memory for storing the character information, and the attribute information entered by the keyboard, a search device for searching for attribute information set for a designated character string in a text, and a controller for substituting for the attribute information searched by the search device, new attribute information entered by the keyboard.

41 Claims, 15 Drawing Sheets

. . . . . . . . . . . . . . . . . . . . . . . . . . . . . . . . . . . . . . . .
. . . . . . . . DATA STORAGE MANAGEMENT . . . . . . . .
. . . . . . . . THE TEXT PREPARED IS NOT . . . . . . . .
. . . . . . . . KEPT STORED IN A SIDE . . . . . . . .
. . . . . . . . DESK OR CABINET . . . . . . . .
. . . . . . . . . . . . . . . . . . . . . . . . . .

| COMMAND PROCESS | | | | | |
|---|---|---|---|---|---|
| HEADLINE | HEADING | SIDE HEADING | RUNNING HEADING 1 | RUNNING HEADING 2 | |
| RUNNING HEADING 3 | RUNNING HEADING 4 | | | | |
| HEADLINE | HEADLINE 1 | HEADLINE 2 | HEADLINE 3 | HEADLINE 3 | |
| PAGING | PAGING 1 | PAGING 2 | FORM | INSERT | |
| MOVE RIGHT | MOVE LEFT | CENTERING | PROPORTIONING | INHIBIT SEPERATION | |
| BASELINE CHANGE | CHANGE VALUE | LINE PITCH | INDENT TAB | | |
| UNDERLINE | OVERLINE | SURROUNDING LINE | RULED LINE / TYPE OF PLANE | | |
| WHITE CHARACTER | RUBY | SUPERSCRIPT | SUBSCRIPT | SMALL CIRCLE | |
| JAPANESE ENHANCEMENT | JAPANESE QUOTATION | JAPANESE NOTE | JAPANESE SPECIAL 1 | JAPANESE SPECIAL 2 | |
| ENGLISH ENHANCEMENT | ENGLISH QUOTATION | ROTATION ANGLE | ENGLISH SPECIAL 1 | ENGLISH SPECIAL 2 | |
| ROTATION | ROTATION ANGLE | ROTATION HORIZONTAL CUT-IN | VERTICAL MEDIUM HORIZONTAL | | |
| STANDARD LETTER SIZE | HALF LETTER SIZE | | | | |
| INSERTION | FLOATING FRAME | | | | |
| SUBSTITUTION COMMAND CHARACTER INPUT | | | | | |

5a / 5b

DATA STORAGE MANAGEMENT
THE TEXT PREPARED IS NOT
KEPT STORED IN A SIDE
DESK OR CABINET

DATA STORAGE MANAGEMENT
THE TEXT PREPARED IS NOT
KEPT STORED IN A SIDE
DESK OR CABINET

```
· · · · · · · · · · · · · · · · · · · · · · · · · · · · · · · · · · · ·
· · · · · · · DATA STORAGE MANAGEMENT · · · · · · · ·
· · · · · · · · THE TEXT PREPARED IS NOT · · · · · · · ·
· · · · · · · ·  KEPT STORED IN A SIDE  · · · · · · · ·
· · · · · · · ·      DESK OR CABINET    · · · · · · · ·
· · · · · · · · · · · · · · · · · · · · · · · · · · · · · · · · · · · ·
```

```
· · · · · · · · · · · · · · · · · · · · · · · · · · · · · · · · · · · · · ·
· · · · · · · DATA STORAGE MANAGEMENT · · · · · · · ·
· · · · · · · THE TEXT PREPARED IS NOT · · · · · · · ·
· · · · · · · KEPT STORED IN A SIDE    · · · · · · · ·
· · · · · · ·     DESK OR CABINET      · · · · · · · ·
```

```
· · · · · · · · · · · · · · · · · · · · · · · · · · · · · · · · · ·
· · · · · · · DATA STORAGE MANAGEMENT · · · · · · · ·
· · · · · · · THE TEXT PREPARED IS NOT · · · · · · · ·
· · · · · · ·   KEPT STORED IN A SIDE    · · · · · · · ·
· · · · · · ·       DESK OR CABINET      · · · · · · ·
· · · · · · · · · · · · · · · · · · · · · · · · · · · · · · · · · ·
```

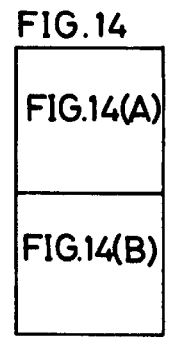
FIG. 14(A)
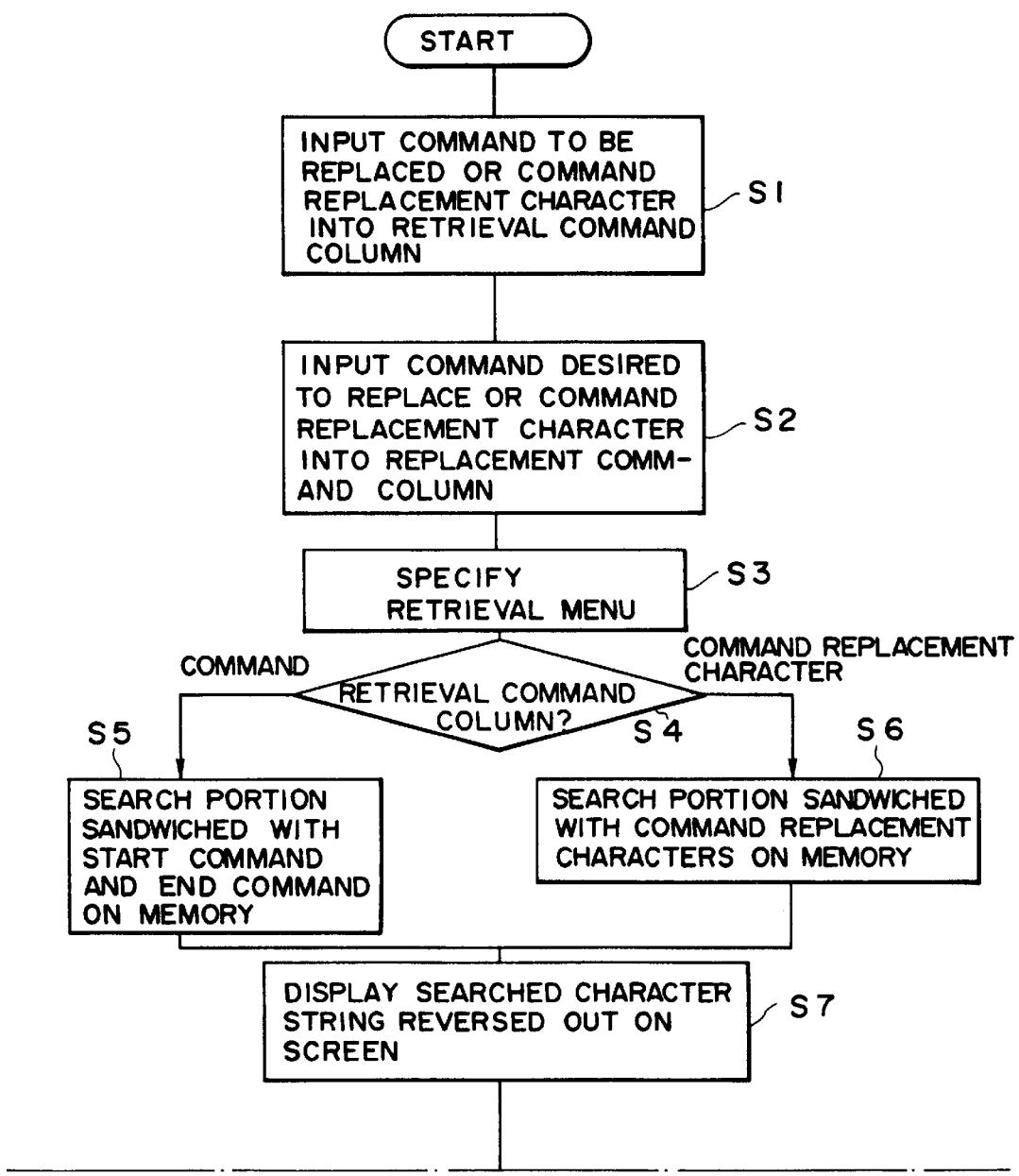

INFORMATION PROCESSING APPARATUS AND METHOD FOR DISPLAYING A FIRST WINDOW DISPLAYING A LIST OF NAMES OF ATTRIBUTE INFORMATION AND A SECOND WINDOW DISPLAYING SEARCH AND SUBSTITUTION COMMAND COLUMNS

This application is a continuation of application Ser. No. 08/048,942 filed Apr. 20, 1993 now abandoned, which is a continuation of application Ser. No. 07/841,775 filed Mar. 2, 1992, now abandoned, which is a continuation of application Ser. No. 07/270,049 filed Nov. 14, 1988, now abandoned.

BACKGROUND OF THE INVENTION

1. Field of the Invention

The present invention relates to a word processor which can issue a command for performing heading, underscore or proportioning operations on input character data.

2. Related Background Art

In a prior art word processor, it is possible to substitute a specified character string in a text or a character string corresponding to a specified area with another character string. However, it is not possible to substitute a command for a heading, an underscore or a proportioning operation relating to the character string or substitute the character string by a command.

The prior art substitution process includes the following problem.

For example, when an enhanced character string having enlarged characters is to be changed to a heading character string, or when all single-line underscores in a text are to be changed to double-line underscores, a process of first resetting the current command and then setting a desired command must be repeated as many times as the number of character strings. This is very troublesome and time consuming. When one command is used many times in a text and small circles must be added to all of specified character strings, a process of adding the small circle must be repeated for each character string. This is also a very troublesome work.

SUMMARY OF THE INVENTION

It is an object of the present invention to provide an information processing apparatus comprising input means for inputting character information and attribute information of the character information, storage means for storing the character information and the attribute information supplied from the input means, and control means for collectively substituting a plurality of attribute information set to certain character string in a text by other attribute information.

It is another object of the present invention to provide an information processing apparatus comprising input means for character information, attribute information of the character information and substitution information, storage means for storing the character information and the attribute information supplied from the input means, and control means responsive to the substitution information for searching a plurality of attribute information set to certain character string in a text stored in the storage means and substituting them by other attribute information.

Other objects of the present invention will be apparent from the description of the embodiment when taken in conjunction with the accompanying drawings.

BRIEF DESCRIPTION OF THE DRAWINGS

FIGS. 3, 7, 8, 10, 11, 12 and 13 show texts displayed on a screen;

FIGS. 5 and 6 show screen displays in the embodiment; and

DESCRIPTION OF THE PREFERRED EMBODIMENTS

Figure 1:
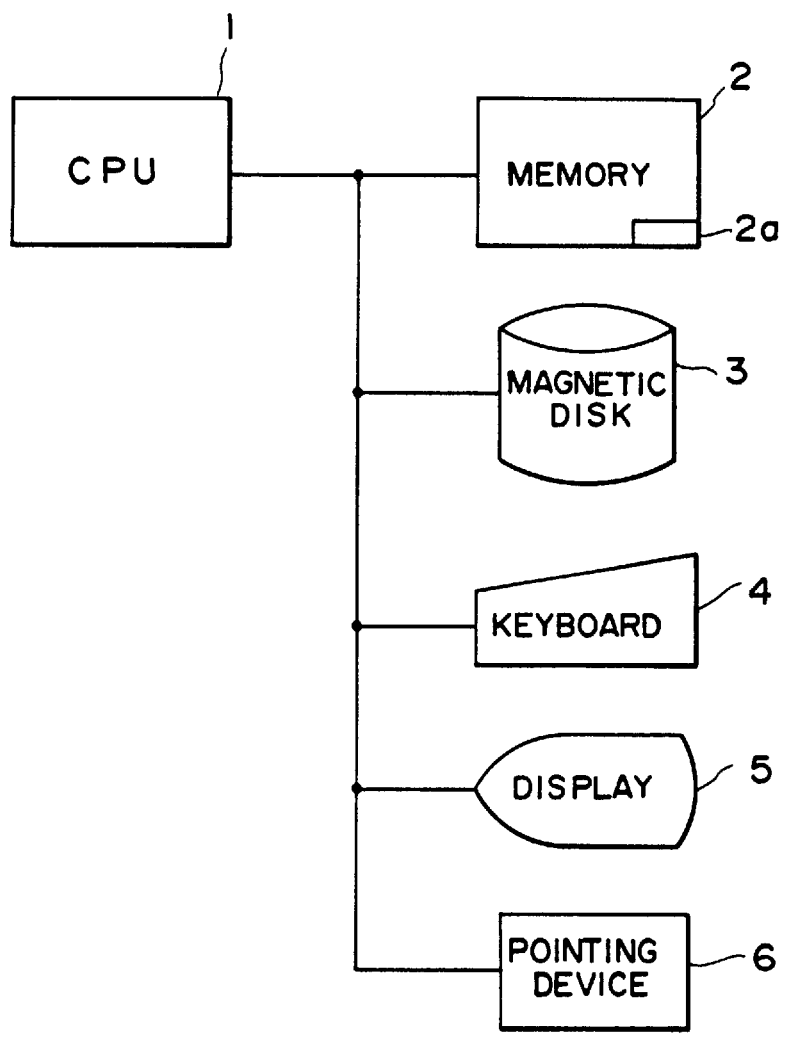
FIG. 1 shows a block diagram of a system in accordance with one embodiment of the present invention.

FIG. 1 shows a configuration of a system of one embodiment of the present invention.

Figure 14B:
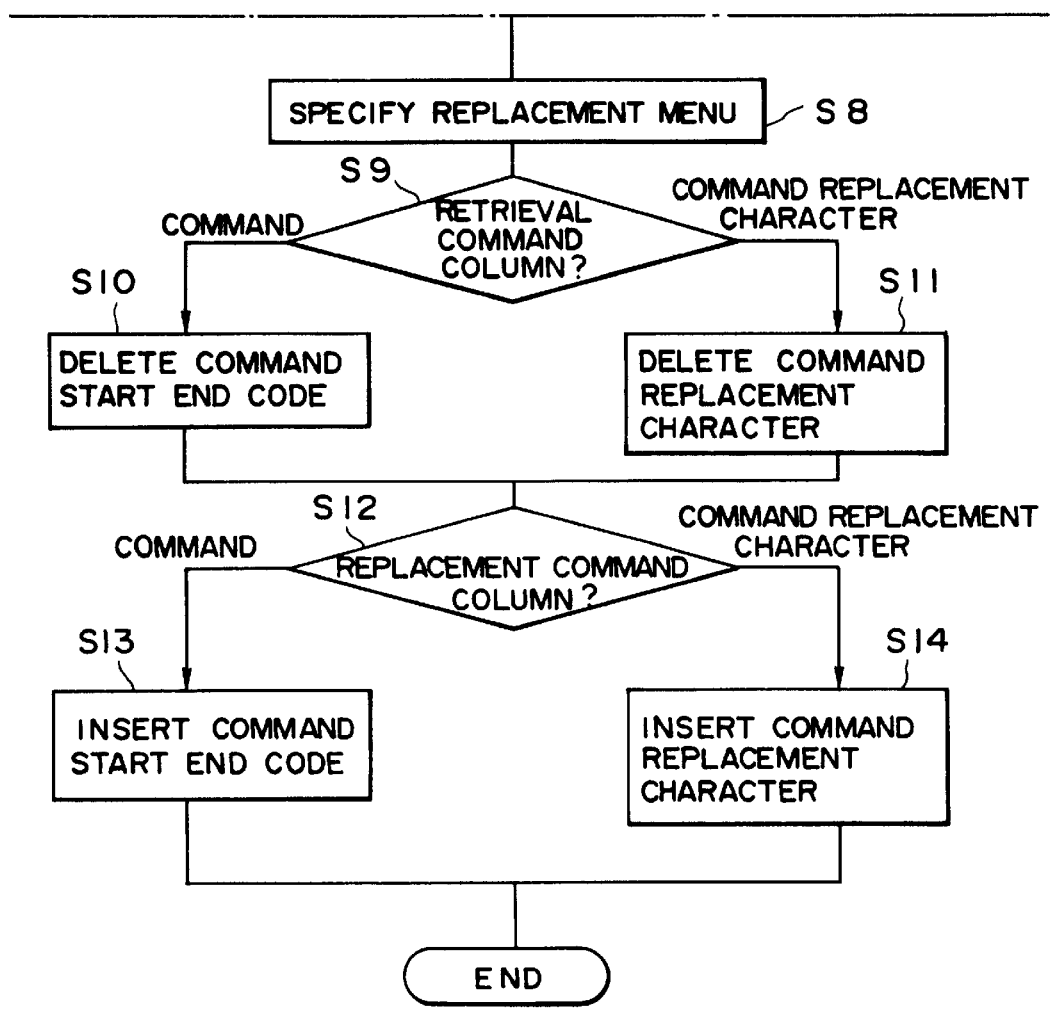
FIG. 14 composed of FIGS. 14(A) and 14(B) shows a flow chart of a process in the embodiment.

Numeral 1 denotes a CPU, numeral 2 denotes a memory which stores a control program which follows a flow chart of FIGS. 14(A) and 14(B) and various edit information during the editing of a text, numeral 3 denotes a magnetic disk for storing text data, numeral 4 denotes a keyboard (KB) for entering data and command when the text is edited, numeral 5 denotes a display for displaying various work areas (windows), and numeral 6 denotes a pointing device (PD) such as a mouse by which an operator moves a cursor on the display screen.

Figure 2:
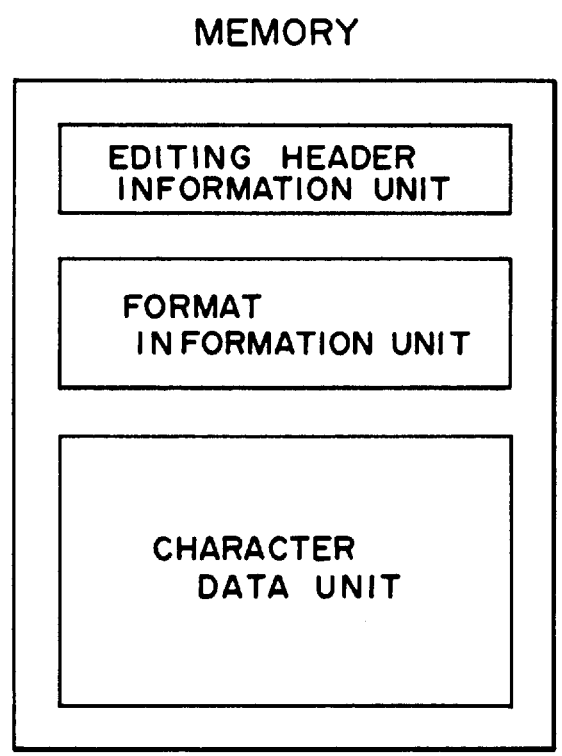
FIG. 2 shows text edit information in the embodiment.

FIG. 2 shows various information stored in the memory 2 during the editing of the text. An editing header information area contains information necessary for the editing such as positions on the memory 2 of character data and graphic data in the text under editing and the position of input cursor.

A format information area contains information relating to format such as sheet information and printing plane information of the text. A character data area contains character data and command data in the text. The format information area and the character data area are stored in the magnetic disk 3 as a text file. The character data uses the JIS C6226 code and of 2 bytes/character size. The command data may or may not include character data therein, or may comprise only one 2-byte code. The command data which is the subject of substitution is limited to the command data including the character data therein. Accordingly, only that command is described below. In the character string relating to the command, there is a 2-byte code indicating the beginning at the start position of the command, followed by character codes of the character string, and there is a 2-byte code indicating the end at the end position.

Figure 3:
Figure 4:
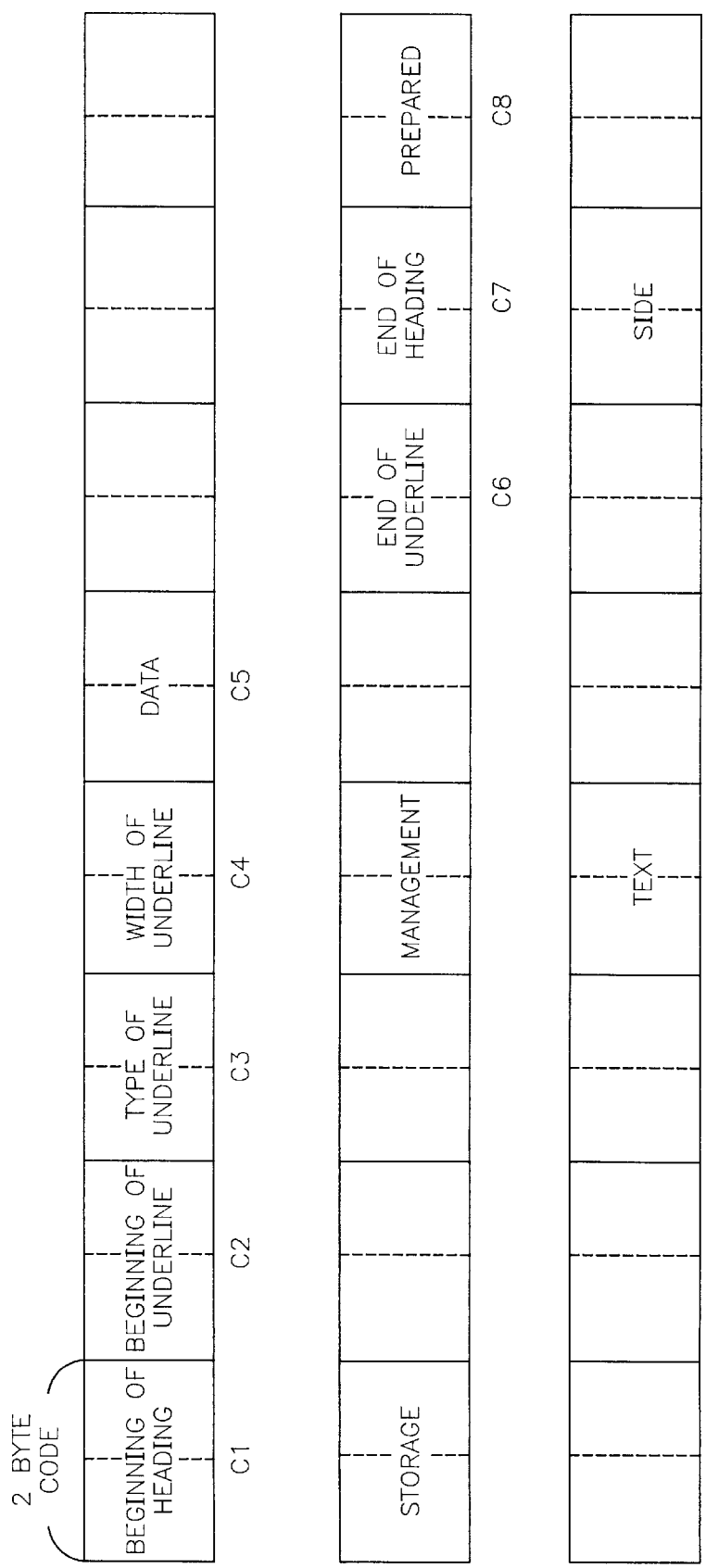
FIGS. 4 and 9 show the status on a memory in the embodiment.

When a text shown in FIG. 3 is stored in the memory 2 and displayed, the character data area on the memory 2 contains the codes shown in FIG. 4, in which bracketed codes are command codes and others are character codes. The character string "Data Reservation and Management" in the text of FIG. 3 has been enlarged by a heading command and an underscore has been drawn by an underscore command. In FIG. 4, C1 is a 2-byte code indicating the beginning of the heading, and C2, C3 and C4 represent the beginning of the underscore and the type and width of the underscore. The characters "Data Reservation and Management" in the JIS C6226 code starts from C5, followed by a code C6 indicating the end of the underscore command and a code C7 indicating the end of the heading. Character codes starting from the character string "The text prepared is" to which no command relates is stored starting from C8 following to the code indicating the end of the heading.

As shown, two or more commands can be overlapped by sandwiching the character string including the command by the beginning and end of command.

A process of command substitution is explained below.

Figure 6:
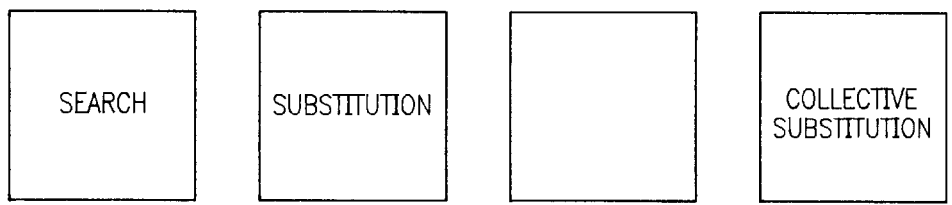

When the start of the command substitution process is instructed by an operator, a window 5a (command window) shown in FIG. 5 which includes all command names, a window 5b having a column (search command column) to which a command to be substituted is input and a column (substitution command column) to which a substituting command is to be input, and a menu as shown in FIG. 6 having three indications, substitution, search and collective substitution for the operator, are displayed on the screen.

[Command to-command Substitution]

A command to be substituted and a substituting command are selected and entered to a search command column and a substitution command column from the command window by moving a cursor by the pointing device (PD) 6 or the keyboard (KB) 4. The "search" menu of FIG. 6 is selected. The command entered in the search command column is searched from the text and it is pointed by the cursor and inversely displayed. Then, the "substitution" menu of FIG. 6 is selected, and the command entered in the search command column in the inverse display area of the text is substituted by the command entered in the window 5b having the substitution command. An example is explained below.

In the text shown in FIG. 3, "underscore" is entered in the search command column and a surrounding line command having a predetermined type of line and type of plane information (explanation of a designation method thereof is omitted here) is entered in the substitution command column from the command window 5b (FIG. 5). Then, the "search" menu is selected. As shown in FIG. 7, the underscored area "Data Reservation and Management" is inversely displayed. Then the "substitution" menu is selected and the underscore is substituted by the surrounding line as shown in FIG. 8.

Figure 9:
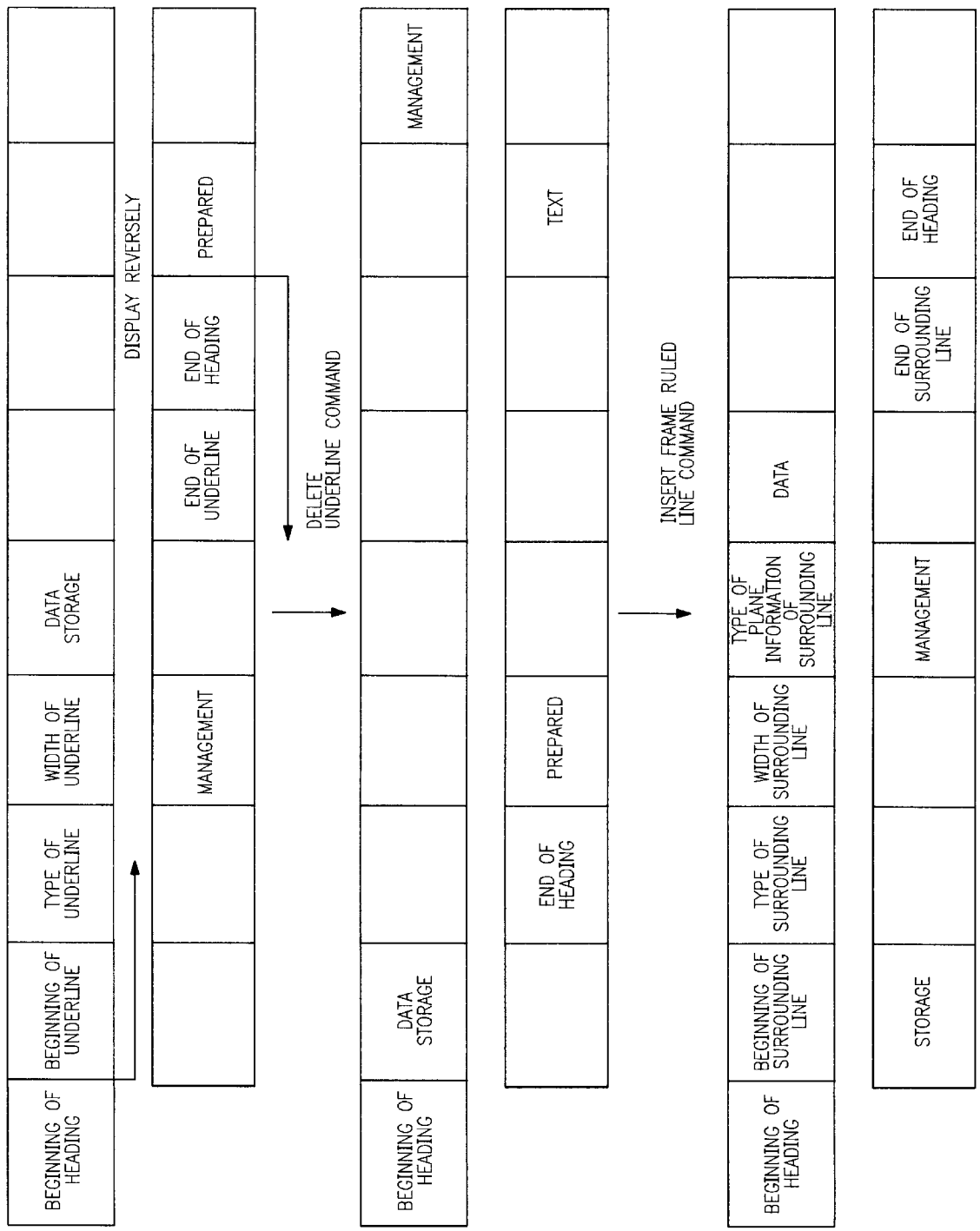

From the memory, the start/end command for the underscore is searched from the character data by the instruction of the "search" menu and it is deleted by the instruction of the "substitution" menu and the surrounding line start command, and type of line and type of plane information and the end command are inserted in place of it. These steps are shown in FIG. 9.

Where all command in the text or all command in certain area are to be substituted by a certain command, for example, where all underscore commands in the text of FIG. 3 are to be substituted by the surrounding line command, the following process is conducted.

The commands are entered in the search command column and the substitution command column in the same manner as that described above, and the area to be substituted is selected by moving the cursor by the pointing device (PD) 6 or the keyboard (KB) 4 and it is inversely displayed as shown in FIG. 10. Then, the "collective substitution" menu of FIG. 6 is selected. Thus, as shown in FIG. 11, the underscores under "Data Reservation and Management" and "Storage" are substituted by the surrounding lines. On the memory 2, the start/end of underscore are searched from the character data and deletion/insertion are repeatedly made as shown in FIG. 9.

[Command substitution character-to-command Substitution]

Two characters to be used as the command substitution characters are entered in the search command column from the keyboard 4, and the substituting command is entered in the substitution command column as is done in the command-to-command substitution. Thereafter, the search menu is selected and then the substitution menu is selected, as is done in the command-to-command substitution.

Figure 13:

In an example shown in FIG. 12, "!" and "$" are used as the command substitution characters. When an overline is to be drawn to "Data Reservation and Management", the two characters "!" and "$" are entered in the search command column, and the overline command is entered in the substitution command column. The search menu and the substitution menu are selected in sequence. As shown in FIG. 13, "!" and "$" are deleted and the overline is drawn over the "Data Reservation and Management" area. The collective substitution may be effected in the same manner as in the command-to-command substitution.

On the memory 2, a character string between "!" and "$" is first searched. Then, "!" is deleted and the start of overline command code, type of line code and width of line code are inserted instead, and "$" is deleted and the end of overline command code is inserted instead. In the collective substitution, the above process is repeated.

[Command-to-command substitution character Substitution]

This is the exact reverse process to that of the command substitution character-to-command substitution.

The command to be substituted is entered in the search command column and the two command substitution characters are entered in the substitution command column. The search menu and the substitution menu are selected in sequence. The command to be substituted in the inversely displayed area is deleted, and instead the first character of the command substitution characters entered in the substitution command column is inserted at the start position of the command, and the second character is inserted at the end position. The collective substitution may be effected as is done in other substitution.

A normal substitution process by the CPU 1 is shown in a flow chart of FIG. 14. In a step S1, the CPU 1 enters in the search command column the substituting command or the command substitution character from the command window of FIG. 5 by the pointing device (PD) 6 or keyboard (KB) 4. The related character string is stored in the buffer 2a. In a step S2, the command to be substituted or the command substitution character is entered in the substitution command column. The related character string is also stored in the buffer 2a. In a step S3, the search menu of FIG. 7 is selected by PD 6 or KB 4. In a step S4, if a command has been entered in the search command column, the process proceeds to a step S5, and if it is a command substitution character, the process proceeds to a step S6. In the step S5, a start code and an end code of the command entered in the search command column are searched from the character data area on the memory 2. In the case of command-to-command substitution, the start code and the end code of underscore are searched. In the step S6, a portion of the character codes between the first and second character codes entered in the search command column is searched from the character data area on the memory 2. In the case of command substitution character-to-command substitution, the portion between "!" and "$" is searched from the character data area. In a step S7, the character string searched from the memory 2 is inversely displayed on the display screen. In a step S8, the substitution menu of FIG. 7 is selected by PD 6 or KB 4. In a step S9, if a command has been entered in the search command column, the process proceeds to a step S10, and if it is a command substitution character, the process proceeds to a step S11. In the step S10, the start of command code and the end of command code searched in the step S5 are deleted from the character code area on the memory 2. In the step S11, the command substitution character searched in the step S6 is deleted.

In a step S12, if the command has been entered in the substitution command column in the step S2, the process proceeds to a step S13, and if the command substitution character has been entered, the process proceeds to a step S14. In the step S13, the start of command code entered in the substitution command column is inserted at the position of the start of command code deleted in the step S10 or at the position of the first character of the command substitution characters deleted in the step S11. Similarly, the end of command code is inserted at the position of the end of command code deleted in the step S10 or at the position of the second character deleted in the step S11. In the case of command-to-command substitution, the start and end of surrounding line command codes are inserted.

In the step S14, the command substitution characters are inserted at the deleted positions as are done in the step S13. In the case of command substitution character-to-command substitution, the start and end of overline command codes are inserted at the positions where the codes "!" and "$" have been deleted, respectively.

In this manner, the normal command substitution is effected.

Alternatively, by entering a command in the search command column and entering nothing in the substitution command column, the command may be deleted. By entering nothing in the substitution command column, the process terminates in the step S1 of FIG. 14. As a result, the command is deleted.

If the above process is effected in the collective substitution, all specified commands in the text or in certain area may be deleted.

Very efficient text editing is provided by the present command substitution method.

We claim:

1. An information processing apparatus comprising:

input means for inputting character information including character strings;

storage means for storing the character information entered by said input means;

attribute information input means for inputting attribute information of a character string of the input character strings stored in said storage means and for inserting start information of the attribute information before a first character of the character string and end information of the attribute information after a last character of the character string;

display control means for displaying the character information entered by said input means on a display unit, said display control means comprising:

means for displaying on the display unit a first command window displaying a list of names of attribute information; and means for displaying on the display unit a second window displaying a search command column to which search attribute information is to be input and displaying on the display unit a substitution command column to which substitution attribute information is to be input;

search information input means for inputting search attribute information into the search command column and inputting substitution attribute information into the substitution command column by designating desired information from the list of names of attribute information displayed in the first command window by said display means;

search information display means for displaying search attribute information and substitute attribute information entered by said search information input means in the search command column and the substitution command column, respectively, of the second window on said display means;

instruction means for instructing a start of a search of the attribute information inputted in the search command column;

search means for searching for start information and the end information of said search attribute information from among information stored in said storage means on the basis of the instruction of said instruction means; and substitution control means for substituting for the start information and the end information of the attribute information searched by said search means, the start information and the end information of the substitution attribute information entered by said attribute information input means, respectively, in response to a manual instruction by the user, wherein said display control means controls the display unit to inversely display all the characters of character strings sandwiched between the start information and the end information of search attribute information inputted into the search command column in response to the performing of all of the following three operations:

said search information input means inputs search attribute information into the search command column by designating desired information from the list of names of attribute information displayed in the first command window by said display means;

said search information input means inputs substitution attribute information into the substitution command column by designating desired information from the list of names of attribute information displayed in the first command window by said display means; and said search means searches for the start and end information of the search attribute information before the user manually instructs substitution for the start information and the end information of the attribute information searched by said search means, the start information and the end information of the substitution attribute information entered by said attribute information input means, respectively.

2. An information processing apparatus according to claim 1 further comprising list-up means for listing up attribute information to enter said attribute information with said input means.

3. An information processing apparatus according to claim 2, further comprising display means for displaying attribute information listed up by said list-up means.

4. An information processing apparatus according to claim 3, further comprising selecting means for selecting attribute information among the listed up attribute information displayed by said display means.

5. An information processing apparatus according to claim 1, wherein said substitution control means comprises means for writing new attribute information in said storage means to substitute for the searched attribute information stored in said storage means.

6. An information processing apparatus according to claim 1, further comprising display means for displaying said character information stored in said storage means.

7. An information processing apparatus according to claim 1, further comprising control means for, when attribute information is searched by said search means, substituting for a display form of the character string defined by said searched attribute information, that of another character string.

8. An information processing apparatus comprising:
input means for inputting character information including character strings;
storage means for storing the character information entered by said input means;
display means for displaying said character information stored in said storage means, said display means comprising:
   means for displaying a first command window displaying a list of names of attribute information; and
   means for displaying a second window displaying a search command column to which search attribute information is to be input and displaying a substitution command column to which substitution attribute information is to be input;
attribute information input means for inputting attribute information of a character string of the input character strings stored in said storage means and for inserting start information of the attribute information before a first character of the character string and end information of the attribute information after a last character of the character string;
search information input means for inputting search attribute information into the search command column and inputting substitution attribute information into the substitution command column by designating desired information from the list of names of attribute information displayed in the first command window by said display means;
search information display means for displaying search attribute information and substitution attribute information entered by said search information input means in the search command column and the substitution command column, respectively, of the second window on said display means;
instruction means for instructing a start of a search of the attribute information inputted in the search command column; and
control means, responsive to selecting the search indication on said menu displayed by said display means, for searching for the start information and the end information of the named searched attribute information stored in said storage means in accordance with the instructing performed by said instruction means and substituting for the start information and the end information of the searched attribute information, the start information and the end information of substitute attribute information in accordance with the name of substitution attribute information entered by said attribute information input means, in response to a manual instruction by the user,
wherein said display means inversely displays all the characters of character strings sandwiched between the start information and the end information of search attribute information inputted into the search command column in response to the performing of all of the following three operations:
   said search information input means inputs search attribute information into the search command column by designating desired information from the list of names of attribute information displayed in the first command window by said display means;
   said search information input means inputs substitution attribute information into the substitution command column by designating desired information from the list of names of attribute information displayed in the first command window by said display means; and
   said control means searches for the start and end information of the named search attribute information before the user manually instructs substitution for the start information and the end information of the attribute information searched by said search means, the start information and the end information of the substitute attribute information entered by said attribute information input means, respectively.

9. An information processing apparatus according to claim 8, further comprising list-up means for listing up attribute information to enter said attribute information.

10. An information processing apparatus according to claim 9, wherein said display means displays attribute information listed up by said list-up means.

11. An information processing apparatus according to claim 10, further comprising selecting means for selecting attribute information among the listed-up attribute information displayed by said display means.

12. An information processing apparatus according to claim 8, wherein said substitution control means comprises means for writing the other attribute information in said storage means to substitute for the searched attribute information stored in said storage means.

13. An information processing apparatus according to claim 8, further comprising display means for displaying said character information stored in said storage means.

14. An information processing apparatus according to claim 8 further comprising control means for, when attribute information is searched by said control means, substituting for the display form of the character string defined by the attribute information, that of another character string.

15. A method for processing information comprising the steps of:
   inputting character information including character strings into an information processing device;
   storing the character information entered in said inputting step;
   inputting attribute information of a character string input in said inputting step and stored in said storing step into the information processing device and inserting start information of the attribute information before a first character of the character string and end information of the attribute information after a last character of the character string;
   storing the attribute information entered in said attribute information inputting step;
   displaying the character information input by said inputting step on display means;
   displaying on the display means a first command window in which is displayed a list of names of attribute information;
   displaying on the display means a second window in which is displayed a search command column to which search attribute information is to be input and a substitution command column to which substitution attribute information is to be input;
   inputting search attribute information into the search command column and inputting substitution attribute information into the substitution command column by designating desired information from the list of names of attribute information displayed in the first command window by the display means;
   displaying search attribute information and substitution attribute information entered in said search attribute information inputting step in the search command column and the substitution command column, respectively, of the second window on the display means on the display means;

instructing a start of a search of the attribute information inputted in the search command column;

searching for the start information and the end information of the search attribute information from among information stored in said storing step on the basis of the instructing in said instructing step; and substituting for the start information and the end information of the attribute information searched in said searching step, the start information and the end information of the substitution attribute information entered in said search information inputting step, in response to a manual operation of the user, wherein, after said searching step and before said substituting step, inversely displaying all the characters of character strings sandwiched between the start information and the end information of search attribute information inputted into the search command column in response to the performing of all of the following three operations:

inputting the search attribute information into the search command column by designating desired information from the list of names of attribute information displayed in the first command window by the display means;

inputting the substitution attribute information into the substitution command column by designating desired information from the list of names of attribute information displayed in the first command window by the display means; and searching for the start and end information of the search attribute information before the user manually instructs the substitution for the start information and the end information of the attribute information searched by said search means, the start information and the end information of the substitute attribute information entered by said attribute information input means, respectively.

16. A method according to claim 15, further including the step of:

listing-up attribute information to input said attribute information.

17. A method according to claim 16, further including the step of:

displaying the attribute information listed up in said listing-up step.

18. A method according to claim 17, further comprising the step of:

selecting attribute information from among the listed-up attribute information displayed in said displaying step.

19. A method according to claim 15, further comprising the step of:

substituting, when attribute information is searched in said searching step, for the display form of the character string defined by said searched attribute information, that of another character string.

20. An information processing apparatus comprising:

character information input means for inputting character information;

storage means for storing the character information entered by said input means;

attribute information input means for inputting the name of attribute information of a character string of the input character information stored in said storage means and for inserting start information of the attribute information before a first character of the character string and end information of the attribute information after a last character of the character string;

storage means for storing the attribute information entered by said attribute information input means;

display control means for displaying the character information input by said character information input means on a display unit, said display control means comprising:

means for displaying on the display unit a first command window displaying a list of names of attribute information; and means for displaying on the display unit a second window displaying a search command column to which search attribute information is to be input and displaying on the display unit a substitution command column to which substitution attribute information is to be input;

search information input means for inputting search attribute information into the search command column and inputting substitution attribute information into the substitution command column by designating desired information from the list of names of attribute information displayed in the first command window by said display means;

search information display means for displaying search attribute information and substitution attribute information entered by said search information input means in the search command column and the substitution command column, respectively, of the second window on said display means;

instruction means for instructing substitution of attribute information; and substitution means for substituting for the start information and the end information of the named previous attribute information of said attribute information stored in said storage means, the start information and the end information of the named attributed information to be substituted on the basis of the instruction of said instruction means, in response to a manual instruction by the user, wherein said display control means controls the display unit to inversely display all the characters of character strings sandwiched between the start information and the end information of search attribute information inputted into the search command column in response to the performing of both of the following two operations:

said search information input means inputs search attribute information into the search command column by designating desired information from the list of names of attribute information displayed in the first command window by said display means; and said search information input means inputs substitution attribute information into the substitution command column by designating desired information from the list of names of attribute information displayed in the first command window by said display means before the user manually instructs substitution for the start information and the end information of the named attribute information searched by said search means, the start information and the end information of the substitution attribute information entered by said attribute information input means, respectively.

21. An information processing apparatus according to claim 20 further comprising list-up means for listing up attribute information to enter said attribute information with said attribute information input means.

22. An information processing apparatus according to claim 21, further comprising display means for displaying attribute information listed up by said list-up means.

23. An information processing apparatus according to claim 22, further comprising selecting means for selecting attribute information among the listed up attribute information displayed by said display means.

24. An information processing apparatus according to claim 20, wherein said substitution means comprises means for writing new attribute information in said storage means to substitute for the previous attribute information stored in said storage means.

25. An information processing apparatus according to claim 20, further comprising display means for displaying the character information stored in said storage means.

26. An information processing apparatus according to claim 20, further comprising control means for, when attribute information is designated by said designation means, substituting for a display form of the character information defined by the designated attribute information, that of another character information.

27. An information processing apparatus comprising:
input means for inputting character information;
storage means for storing the character information entered by said input means, the character information including a first character and a second character;
display control means for displaying the character information input by said input means on a display unit, said display control means comprising:
  means for displaying on the display unit a first command window displaying a list of names of attribute information; and
  means for displaying on the display unit a second window displaying a search command column to which search attribute information is to be input and displaying on the display unit a substitution command column to which substitution attribute information is to be input;
information input means for inputting the character information into the search command column and inputting substitution attribute information into the substitution command column by designating substitution attribute information from the list of names of attribute information displayed in the first command window by display means;
search information display means for displaying the character information and substitution attribute information entered by said search input means in the search command column and the substitution command column, respectively, of the second window on said display means;
instruction means for instructing the substitution of the substitution attribute information for the character information entered by said information input means;
search means for searching for the first character and the second character on the basis of the instruction of said instruction means; and
substitution means for substituting for the first character and the second character searched by said search means, the substitution attribute information on the basis of the instruction of said instruction means, said display means displaying characters inserted between the first character and the second character as characters to which the substitution attribute information is appended, when the first character and the second character are substituted by the substitution attribute information by the operation of said substitution means, in response to a manual instruction by the user,
wherein said display control means controls the display unit to inversely display all the characters between the first and second characters in response to the performing of all of the following three operations:
  said information input means inputs character information into the search command column;
  said information input means inputs substitution attribute information into the substitution command column by designating desired information from the list of names of attribute information displayed in the first command window by said display means; and
  said search means searches for the first and second characters on the basis of the instruction of said instruction means before the user manually instructs substitution for the first and second characters searched by said search means, the substitution attribute information.

28. An information processing apparatus according to claim 27, further comprising list-up means for listing up attribute information to enter the attribute information with said input means.

29. An information processing apparatus according to claim 28, further comprising display means for displaying attribute information listed up by said list-up means.

30. An information processing apparatus according to claim 29, further comprising selecting means for selecting attribute information among the listed up attribute information displayed by said display means.

31. An information processing apparatus according to claim 27, wherein said substitution means comprises means for writing new attribute information in said storage means to substitute for the searched attribute information stored in said storage means.

32. An information processing apparatus according to claim 27, further comprising display means for displaying the character information stored in said storage means.

33. An information processing apparatus according to claim 27, wherein said search means searches for attribute information, said apparatus further comprising control means for, when attribute information is searched by said search means, substituting for a display form of the character information defined by said searched attribute information, that of another character information.

34. An information processing apparatus comprising:
input means for inputting character information including character strings;
storage means for storing the character information entered by said input means;
attribute information input means for inputting attribute information of a character string of the input character strings stored in said storage means and for inserting start information of the attribute information before a first character of the character string to which the attribute information in appended and end information of the attribute information after a last character of the character string;
display control means for displaying the character information input by said input means on a display unit, said display control means comprising:
  means for displaying on the display unit a first command window displaying a list of names of attribute information; and means for displaying on the display unit a second window displaying a search command column to which search attribute information is to be input and displaying on the display unit a substitution command column to which substitution attribute information is to be input;

search information input means for inputting search attribute information into the search command column and inputting substitution attribute information into the substitution command column by designating desired information from the list of names of attribute information displayed in the first command window by display means;

search information display means for displaying search attribute information and substitution attribute information entered by said search information input means in the search command column and the substitution command column, respectively, of the second window on said display means;

instruction means for instructing a start of a search of the attribute information inputted in the search command column;

search means for searching for the start information and the end information of said search attribute information from among attribute information stored in said storage means on the basis of the instruction of said instruction means; and display control means for controlling said display means to inversely display a character string inserted between the start information and the end information in a form different from other character strings in response to the performing of all of the following three operations:
  said search information input means inputs search attribute information into the search command column by designating desired information from the list of names of attribute information displayed in the first command window by said display means;
  said search information input means inputs substitution attribute information into the substitution command column by designating desired information from the list of names of attribute information displayed in the first command window by said display means; and
  said search means searches for the start and end information of the search attribute information of the search attribute information on the basis of the instruction of said instruction means.

35. An information processing apparatus according to claim 34, further comprising list-up means for listing up attribute information to enter the attribute information with said input means.

36. An information processing apparatus according to claim 35, further comprising display means for displaying attribute information listed up by said list up means.

37. An information processing apparatus according to claim 36, further comprising selecting means for selecting attribute information among the list up attribute information displayed by said display means.

38. An information processing apparatus according to claim 34, further comprising display means for displaying the character information stored in said storage means.

39. A method for processing information comprising the steps of:
  inputting character information into an information processing device;
  storing the character information entered in said character information inputting step;
  inputting the name of attribute information of a character string of the input character information stored in said storing step and inserting start information of the named attribute information before a first character of the character string and end information of the attribute information after a last character of the character string;
  storing the attribute information entered in said attribute information inputting step;
  displaying the character information input by said character information inputting step on display means;
  displaying on the display means a first command window in which is displayed a list of names of attribute information;
  displaying on the display means a second window in which is displayed a search command column to which search attribute information is to be input and a substitution command column to which substitution attribute information is to be input;
  inputting search attribute information into the search command column and inputting substitution attribute information into the substitution command column by designating desired information from the list of names of attribute information displayed in the first command window by the display means;
  displaying search attribute information in the search command column and displaying substitution attribute information in the substitution command column entered in said search attribute information inputting step on the display means;
  instructing substitution of attribute information; and
  substituting for the start information and the end information of the previous attribute information of the attribute information stored in said storing step, the start information and the end information of the attribute information to be substituted on the basis of the instruction in said instructing step, in response to a manual operation of the user,
  wherein, after said search attribute displaying step and before said substitution instructing step, inversely displaying all the characters of character strings sandwiched between the start information and the end information of search attribute information inputted into the search command column in response to the performing of both of the following two operations:
    inputting the search attribute information into the search command column by designating desired information from the list of names of attribute information displayed in the first command window by the display means; and
    inputting the substitution attribute information into the substitution command column by designating desired information from the list of names of attribute information displayed in the first command window by the display means before the user manually instructs the substitution for the start information and the end information of the previous attribute information, the start information and the end information of the attribute information to be substituted.

40. A method for processing information comprising the steps of:
  inputting character information into an information processing device;
  displaying the character information input by said inputting step on display means;
  displaying on the display means a first command window in which is displayed a list of names of attribute information;

displaying on the display means a second window in which is displayed a search command column to which search attribute information is to be input and a substitution command column to which substitution attribute information is to be input;

inputting attribute information into the search command column by designating desired information from the list of names of attribute information displayed in the first command window by the display means and inputting substitution attribute information into the substitution command column by designating desired information from the list of names of attribute information displayed in the first command window by the display means;

storing the character information entered in said inputting step;

displaying search attribute information and substitution attribute information entered in said attribute information inputting step in the search command column and the substitution command column, respectively, of the second window on the display means;

instructing the substitution of start information of attribute information of a character string of the character information before a first character of the character string, and the substitution of end information of the attribute information of the character string after a last character of the character string in response to a manual operation of the user;

searching for the start information and the end information of the attribute information on the basis of the instruction in said instructing step; and controlling characters inserted between the start information and the end information searched in said searching step on the basis of the attribute information, wherein, after said search attribute displaying step and before said substitution instructing step, inversely displaying all the characters of character strings sandwiched between the start information and the end information of search attribute information inputted into the search command column in response to the performing of both of the following two operations:

inputting the search attribute information into the search command column by designating desired information from the list of names of attribute information displayed in the first command window by the display means; and inputting the substitution attribute information into the substitution command column by designating desired information from the list of names of attribute information displayed in the first command window by the display means before the user manually instructs the substitution for the start information and the end information of the attribute information, the start information and the end information of the attribute information to be substituted.

41. A method for processing information comprising the steps of:

inputting character information including character strings into an information processing device;

storing the character information entered in said inputting step;

inputting attribute information of a character string of the input character strings stored in said storing step and inserting start information of the attribute information before a first character of the character string and end information of the attribute information after a last character of the character string;

displaying the character information input by said inputting step on display means;

displaying on the display means a first command window in which is displayed a list of names of attribute information;

displaying on the display means a second window in which is displayed a search command column to which search attribute information is to be input and a substitution command column to which substitution attribute information is to be input;

inputting search attribute information into the search command column and inputting substitution attribute information into the substitution command column by designating desired information from the list of names of attribute information displayed by display means in the first command window;

displaying search attribute information in the search command column and displaying substitution attribute information in the substitution command column entered in said search attribute information inputting step on the display means;

instructing a start of a search of the attribute information inputted in the search command column; and searching for the start information and the end information of the attribute information among attribute information stored in said storing step on the basis of the instruction in said instructing step, wherein, after said searching step, inversely displaying all the characters of character strings sandwiched between the start information and the end information of search attribute information inputted into the search command column in response to the performing of all of the following three operations:

inputting the search attribute information into the search command column by designating desired information from the list of names of attribute information displayed in the first command window by the display means;

inputting the substitution attribute information into the substitution command column by designating desired information from the list of names of attribute information displayed in the first command window by the display means; and searching for the start and end information of the search attribute information on the basis of the instruction in said instructing step.

* * * * *

UNITED STATES PATENT AND TRADEMARK OFFICE
CERTIFICATE OF CORRECTION

PATENT NO. : 5,867,700
DATED : February 2, 1999
INVENTOR(S) : HITOSHI OHKURA ET AL.

It is certified that error appears in the above-indentified patent and that said Letters Patent is hereby corrected as shown below:

TITLE PAGE, ITEM [56]
   References Cited
        "4,653,620" should read --4,653,020--.

Other Publications
   Line 10, "amatution" should read --annotation--.
   Line 11, "Guid," should read --Guide--.
   Line 12, "Schnell" should read --schnell--.

Column 1
   Line 39, "a" should be deleted.
   Line 49, "certain should read --a certain--.

Column 6
   Line 44, "claim 1" should read --claim 1,--.

Column 8
   Line 28, "claim 8" should read --claim 8,--.

UNITED STATES PATENT AND TRADEMARK OFFICE
CERTIFICATE OF CORRECTION

PATENT NO. : 5,867,700
DATED : February 2, 1999
INVENTOR(S) : HITOSHI OHKURA ET AL.

It is certified that error appears in the above-indentified patent and that said Letters Patent is hereby corrected as shown below:

Column 9
    Line 2, "on the display means" should be deleted.

Column 10
    Line 67, "claim 20" should read --claim 20,--.

Column 13
    Line 54, "list up" should read --list-up--.
    Line 57, "list up" should read --list-up--.

Signed and Sealed this

Twenty-third Day of November, 1999

Attest:

Q. TODD DICKINSON

Attesting Officer         Acting Commissioner of Patents and Trademarks